(12) United States Patent
Kahn

(10) Patent No.: US 11,932,357 B2
(45) Date of Patent: Mar. 19, 2024

(54) SURFBOARD BAG

(71) Applicant: DIRTBAG SUPPLY CO. LLC, San Clemente, CA (US)

(72) Inventor: Theodore George Kahn, San Clemente, CA (US)

(73) Assignee: DIRTBAG SUPPLY CO. LLC, San Clemente, CA (US)

( * ) Notice: Subject to any disclaimer, the term of this patent is extended or adjusted under 35 U.S.C. 154(b) by 0 days.

(21) Appl. No.: 17/671,976

(22) Filed: Feb. 15, 2022

(65) Prior Publication Data

US 2022/0258839 A1 Aug. 18, 2022

Related U.S. Application Data

(60) Provisional application No. 63/149,791, filed on Feb. 16, 2021.

(51) Int. Cl.
| | |
|---|---|
| *B60R 9/08* | (2006.01) |
| *B60R 9/052* | (2006.01) |
| *B63B 32/83* | (2020.01) |
| *B63B 32/87* | (2020.01) |

(52) U.S. Cl.
CPC .............. *B63B 32/83* (2020.02); *B60R 9/052* (2013.01); *B60R 9/08* (2013.01); *B63B 32/87* (2020.02)

(58) Field of Classification Search
CPC ..................................................... B60R 9/08
USPC ....................................................... 224/318
See application file for complete search history.

(56) References Cited

U.S. PATENT DOCUMENTS

| | | | | |
|---|---|---|---|---|
| 3,946,917 | A * | 3/1976 | Crawford | B60R 9/08 224/317 |
| 4,402,442 | A | 9/1983 | Martino | |
| 4,779,779 | A * | 10/1988 | Haugland | B60R 9/065 410/97 |
| 4,793,535 | A * | 12/1988 | Johnson | B60R 9/048 224/329 |
| 5,094,344 | A | 3/1992 | Savage | |
| 5,405,002 | A * | 4/1995 | Troia | B63C 13/00 206/335 |
| 5,769,291 | A | 6/1998 | Chasan | |
| 5,918,929 | A * | 7/1999 | Vagis | B60R 9/04 296/180.1 |
| 6,230,951 | B1 * | 5/2001 | Anderson | A45F 3/15 224/329 |
| D511,623 | S | 11/2005 | Malloy | |
| 10,145,650 | B1 * | 12/2018 | Terhark | F41C 33/045 |
| 2004/0178243 | A1 * | 9/2004 | Clark | B60R 9/08 224/314 |

(Continued)

FOREIGN PATENT DOCUMENTS

WO   WO-2006115450 A1 * 11/2006 ............. B60R 9/055

*Primary Examiner* — Scott T McNurlen
(74) *Attorney, Agent, or Firm* — Knobbe Martens Olson & Bear, LLP

(57) ABSTRACT

A surfboard bag for improving transportation of a surfboard with varying modes of transportation. The surfboard bag includes one or more straps that can couple the surfboard bag to a roof of a vehicle. The surfboard bag includes an integrated rack system to space the surfboard away from the roof of the vehicle—protecting the surfboard and the vehicle. The surfboard bag includes a shoulder strap and one or more handles to facilitate carrying. The surfboard bag includes one or more pockets to store a wet or dry suit and other objects therein.

5 Claims, 17 Drawing Sheets

(56) References Cited

U.S. PATENT DOCUMENTS

| | | | |
|---|---|---|---|
| 2006/0180622 A1* | 8/2006 | Dexter | B60R 9/055 220/9.4 |
| 2007/0181622 A1* | 8/2007 | Rocchio | B60R 9/058 224/325 |
| 2009/0308902 A1 | 12/2009 | Rex | |
| 2010/0006469 A1 | 1/2010 | Allouche | |

* cited by examiner

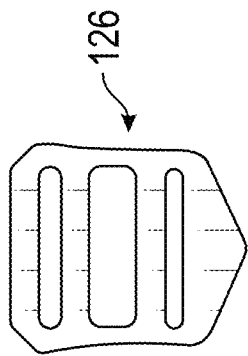
FIG. 2C
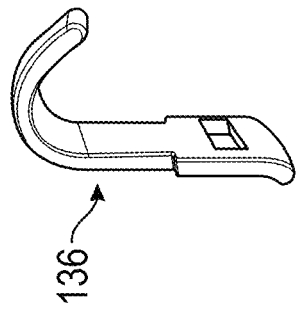
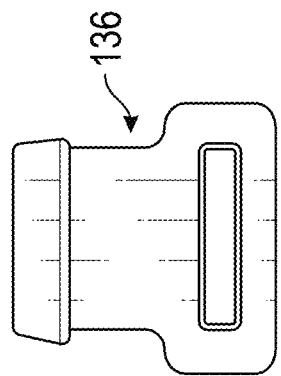
FIG. 2D
FIG. 2E
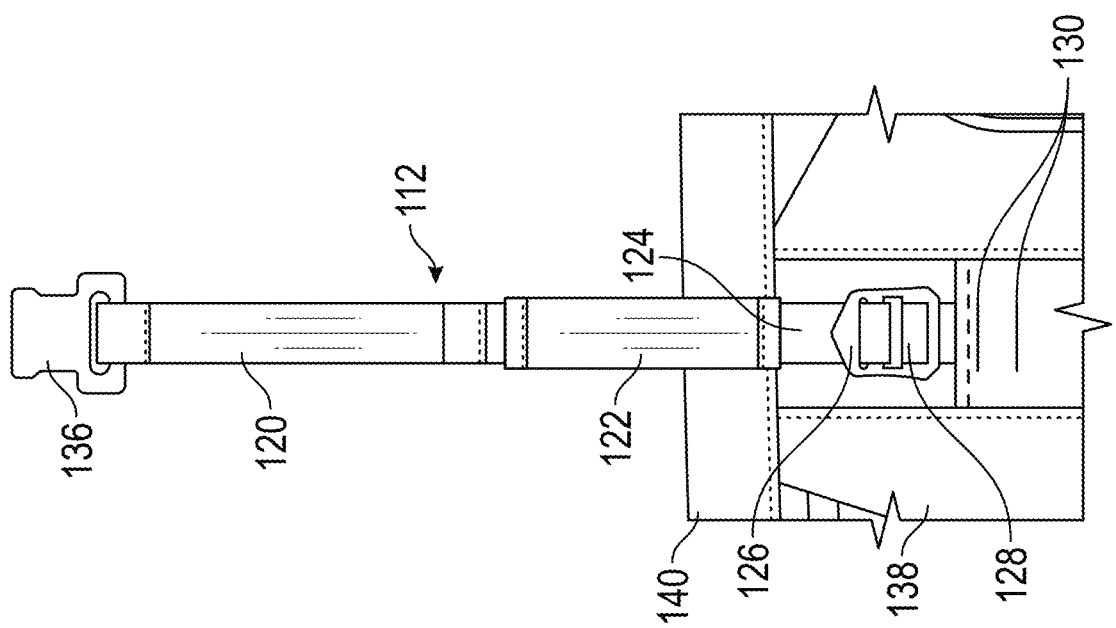
FIG. 2B

SURFBOARD BAG

CROSS REFERENCE TO RELATED APPLICATIONS

This application claims priority to U.S. Provisional Patent Application No. 63/149,791, filed Feb. 16, 2021, which is incorporated herein by reference in its entirety. Any and all applications, if any, for which a foreign or domestic priority claim is identified in the Application Data Sheet of the present application are hereby incorporated by reference under 37 CFR 1.57.

FIELD

The present application relates generally to improving the handling of sport boards during transportation, and more particularly, to a surfboard bag that enables a user to conveniently carry a surfboard and transport the surfboard on a roof of a vehicle.

BACKGROUND

Surfboards and other sport boards, such as paddle boards, snowboards, skis, and the like, are notoriously difficult to handle during transportation. Despite that difficulty, surfers often travel the world near and far chasing swells. Traveling may necessitate carrying the surfboard, attaching the surfboard to a roof of a vehicle, or even checking the surfboard with an airline for air transport or using public transportation.

SUMMARY

It can be difficult, however, for surfers to transition between different modes of transporting a surfboard. Each transportation method may present unique challenges to the surfer. For example, carrying the surfboard may be tiring and/or limit the surfers ability to use his or her hands during transport. Additionally, attaching the surfboard to a roof of a vehicle may involve attachment mechanisms and accommodating for vehicles with different roof racks or lack thereof. Further, checking the surfboard with an airline for air transport or using public transportation can expose the surfboard to damage. Thus, overall, many parts of transporting the surfboard can be difficult and cumbersome. Accordingly, a surfer's experience can be enhanced by easing transportation of the surfboard through the various transportation modes. Although various embodiments are disclosed herein in connection with transporting surfboards, other types of sport boards (e.g., paddle boards, snowboards, skis, and the like) or equipment can be transported according to the embodiments disclosed herein.

Various embodiments of a surfboard bag are described herein. In some exemplary disclosures, the surfboard bag can facilitate transporting a surfboard by way of various modes of transportation, which can include carrying the surfboard, attaching the surfboard to the roof of a vehicle, and/or protecting the surfboard during air transport, public transportation, or the like. In some variants, the surfboard bag can include a rack system, which can be integrated with the surfboard bag. The rack system can enable the surfboard bag to rest directly on the roof of the vehicle (e.g., when the vehicle does not have a roof rack) without damaging the surfboard and/or the roof. For example, the rack system can include rails on a bottom portion of the bag that can space the surfboard—within the surfboard bag—away from the roof of the vehicle. When the vehicle does have a roof rack, the rack system can accommodate roof racks with cross supports that are spaced apart from each other at varying distances. For example, in some exemplary embodiments, the surfboard bag's rack system can include rails on a lower portion thereof that are oriented in the longitudinal direction of the surfboard bag such that the rails can contact cross supports of a roof rack of the vehicle with varying distances of separation between the cross supports (e.g., less than 1, 1, 2, 3, 4, 5, or 6 or more feet). Additionally, the rails can add rigidity to the surfboard bag, which can help to resist bending of the surfboard bag and/or surfboard around a transverse axis (e.g., an axis that is perpendicular to a longitudinal axis) of the surfboard bag. Moreover, the rails can help to protect the surfboard bag during handling and storage for air transportation, using public transportation, or the like. For example, the rails can contact a conveyor or other surface to protect the surfboard within the bag, which can include spacing the surfboard away from the conveyor or other surface.

In some exemplary disclosures, the surfboard bag can include an attachment system that can facilitate attaching the surfboard bag to the roof rack of the vehicle and/or the roof itself by way of extending through the door openings of the vehicle or attaching to some other feature. The attachment system can include one or more straps. The attachment system can be integrated with (e.g., coupled to) to the surfboard bag. The integration of the rack system and/or attachment system into the surfboard bag can enable a surfer to be ready for a variety of transportation scenarios, which can include transporting by way of a vehicle with or without a roof rack or by way of air travel, public transportation, or the like.

In some exemplary disclosures, the surfboard bag can include features that can enable the user thereof to conveniently carry the surfboard. The surfboard bag can include and/or couple to a shoulder strap for carrying the surfboard, which can make the surfboard easier to carry and free the user's hands. In some variants, the surfboard can include one or more handles to facilitate grasping and holding the surfboard bag. In some exemplary disclosures, the surfboard bag can include padding to protect the surfboard from damage and/or prevent the surfboard from damaging other objects. The surfboard bag can include one or more pockets to store a wet or dry suit and/or other items.

In some variants, a flexible enclosure configured to protectively transport sports equipment is disclosed herein. The flexible enclosure can include an outer portion. The flexible enclosure can include an inner portion opposite said outer portion. The inner portion can be shaped generally to store a type of sports equipment. The flexible enclosure can include one or more straps integrated into (e.g., coupled to) the outer portion and configured to couple the outer portion to a vehicle. In some variants, the straps are not integrated. The flexible enclosure can include at least one elongate rail. The at least one elongate rail can include a semi-rigid material. The at least one elongate rail can be oriented along the outer portion in a longitudinal direction of sufficient length to space the outer portion away from a surface of the vehicle when the one or more straps couple the outer portion to the vehicle.

In some variants, the flexible enclosure can form a surfboard bag.

In some variants, the elongate rail can include one or more semi-rigid rail inserts.

In some variants, the at least one elongate rail can include a hollow interior portion that can receive the one or more semi-rigid rail inserts.

In some variants, the at least one elongate rail can include one or more access panels that can be removed to provide access to the hollow interior portion for removable insertion of the one or more semi-rigid rail inserts.

In some variants, the one or more semi-rigid rail inserts can include foam.

In some variants, the at least one elongate rail can have a polygonal exterior periphery.

In some variants, the at least one elongate rail can have a rectangular exterior periphery.

In some variants, the at least one elongate rail can have a circular exterior periphery.

In some variants, the at least one elongate rail can have a hex-shaped exterior periphery.

In some variants, the at least one elongate rail can have a multi-shaped exterior periphery.

In some variants, the at least one elongate rail can have a chamfered or rounded edge.

In some variants, the at least one elongate rail can have a flat surface that can face the vehicle when the flexible enclosure is coupled to the vehicle.

In some variants, the one or more straps can couple the outer portion to a roof rack of the vehicle.

In some variants, the one or more straps can couple the outer portion directly to a roof of the vehicle.

In some variants, the one or more straps can include webbing.

In some variants, the interior portion can include padding that can protect the sports equipment.

In some variants, the outer portion can have one or more pockets. One of the one or more pockets can receive additional sports gear.

In some variants, the one of the one or more pockets can receive a wetsuit.

In some variants, the one of the one or more pockets can receive a snow suit.

In some variants, the type of sports equipment can be a surfboard.

In some variants, the type of sports equipment can be a snowboard.

In some variants, the type of sports equipment can be one or more skis.

In some variants, the type of sports equipment can be a windsurf board.

In some variants, the type of sports equipment can be a paddle board, skateboard, kayak, inflatable device, fishing poles, and/or other sports equipment.

In some variants, the at least one elongate rail can include two elongate rails.

In some variants, the two elongate rails can be the same length.

In some variants, the two elongate rails can be substantially parallel along the outer portion.

In some variants, the two elongate rails can be exactly parallel.

In some variants, the third elongate rail can be disposed between the two elongate rails.

In some variants, the three elongate rails can be the same length.

In some variants, the two elongate rails can be equally spaced away from the third elongate rail.

In some variants, the two elongate rails can be in mirrored configurations relative to the third elongate rail.

In some variants, a method of attaching a sports board to a vehicle is disclosed. The method can include opening a flexible enclosure. The method can include inserting the sports board into the flexible enclosure. The method can include attaching one or more straps to the flexible enclosure. The method can include positioning the flexible enclosure on top of the vehicle such that at least one elongate rail of the flexible enclosure is disposed between the sports board and the vehicle. The method can include orienting the at least one elongate rail in a longitudinal direction of the vehicle. The method can include coupling the one or more straps to the vehicle to secure the sports board within the flexible enclosure to the vehicle.

In some variants, attaching the one or more straps to the flexible enclosure can include inserting one of the one or more straps through a ladderlock buckle attached to the flexible enclosure.

In some variants, attaching the one or more straps to the flexible enclosure can include inserting one side of a side release buckle attached to the one or more straps into another corresponding side of the side release buckle attached to the flexible enclosure.

In some variants, attaching the one or more straps to the flexible enclosure can include inserting the one of the one or more straps through a cam buckle attached to the flexible enclosure.

In some variants, attaching the one or more straps to the vehicle can include attaching the one or more straps to a roof rack of the vehicle.

In some variants, attaching the one or more straps to the roof rack of the vehicle can include attaching one side of one of the one or more straps to a side of the flexible enclosure, wrapping the one of the one or more straps around at least a portion of the roof rack, and attaching the one of the one or more straps to another side of the flexible enclosure.

In some variants, coupling the one or more straps to the roof rack of the vehicle can include attaching hooks of the one or more straps to the roof rack of the vehicle.

In some variants, attaching the one or more straps to the vehicle can include attaching the one or more straps directly to a roof of the vehicle.

In some variants, attaching the one or more straps to the roof of the vehicle can include attaching one side of one of the one or more straps to a side of the flexible enclosure, inserting the one of the one or more straps through the door openings of the vehicle such that the one of the one or more straps wraps around the roof of the vehicle, and attaching the one of the one or more straps to another side of the flexible enclosure.

In some variants, coupling the one or more straps to the roof of the vehicle can include attaching hooks of the one or more straps to one or more door opening peripheries of the vehicle.

BRIEF DESCRIPTION OF THE DRAWINGS

Various embodiments are depicted in the accompanying drawings for illustrative purposes and may not be drawn to scale, and should in no way be interpreted as limiting the scope of the embodiments. In addition, various features of different disclosed embodiments can be combined to form additional embodiments, which are part of this disclosure.

FIG. 2B illustrates an enlarged view of a strap of an attachment system of the surfboard bag.

FIG. 2C illustrates an example ladderlock buckle of the attachment system.

FIGS. 2D and 2E illustrate an example hook of the attachment system.

DETAILED DESCRIPTION

Although certain embodiments and examples are described below, this disclosure extends beyond the specifically disclosed embodiments and/or uses and obvious modifications and equivalents thereof. Thus, it is intended that the scope of this disclosure should not be limited by any particular embodiments described below.

Figure 1A:
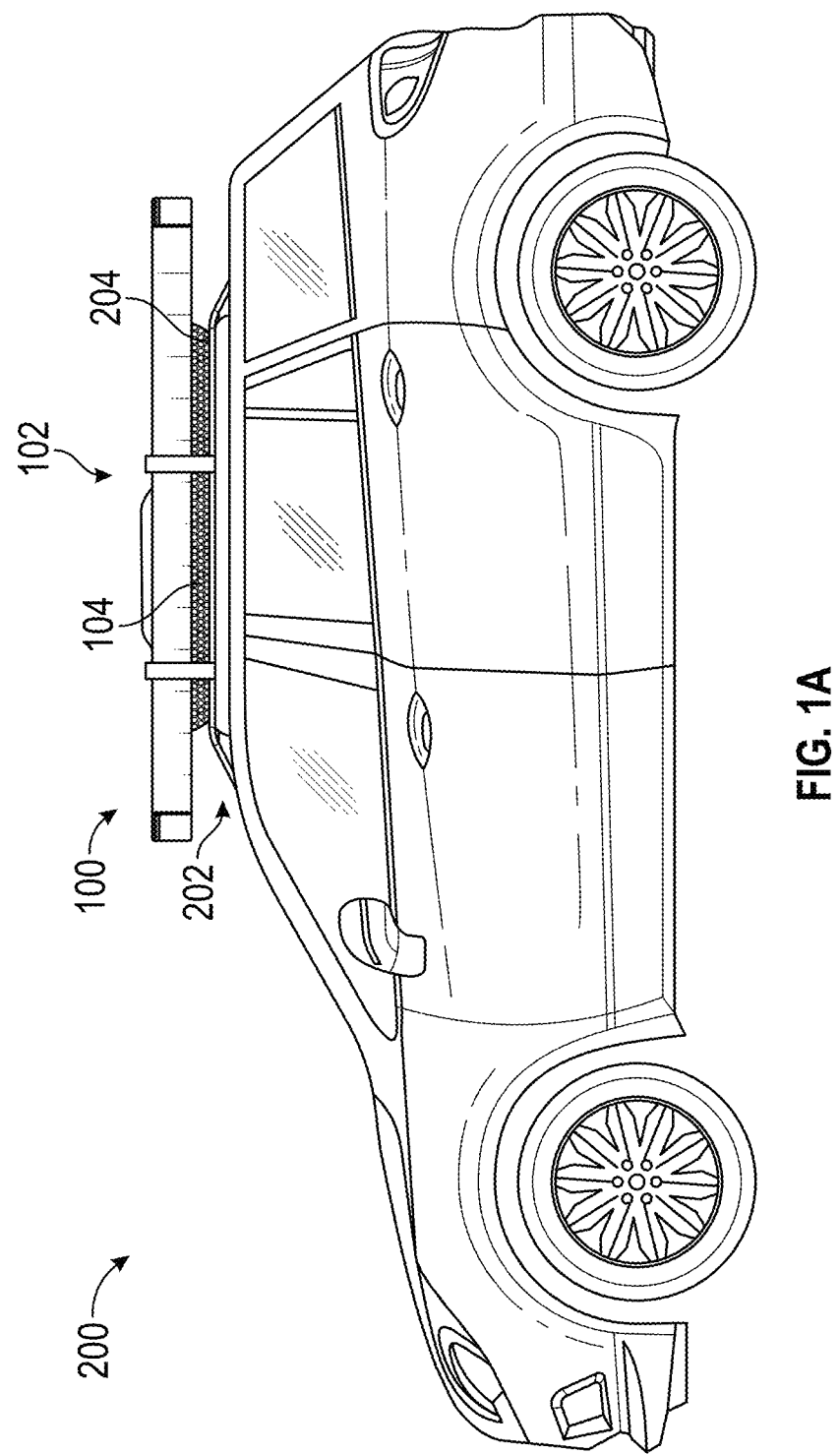
FIG. 1A illustrates an example surfboard bag attached to a roof rack of a vehicle.

FIG. 1A illustrates an example surfboard bag 100, which can also be referred to as a flexible enclosure, enclosure, sports board bag, sports utility bag, utility bag, travel bag, bag, surfboard container, board container, travel container, container, surfboard case, board case, case, etc. The surfboard bag 100 can house a surfboard therein. In some exemplary embodiments, the surfboard bag 100 can house more than one surfboard therein (e.g., two). For example, the surfboard bag 100 can include an inner portion shaped generally to store a type of sports equipment. The inner portion can be opposite an outer portion of the surfboard bag 100. In some variants, the surfboard bag 100 can include a partition to separate two or more boards in the surfboard bag 100, which can lessen or prevent the undesired transfer of wax from the top of one board to the fin-side of another board. In some variants, the bag 100 can house other sports equipment (e.g., paddle board, snow board, skis, windsurf board, skateboard, kayak, inflatable device, fishing poles, etc.) therein.

As illustrated, the surfboard bag 100 is coupled to a roof rack 202, also referred to as a rack, of a vehicle 200 (e.g., car, truck, sports utility vehicle, van, etc.) for transportation. The surfboard bag 100 can include an attachment system 102 that can facilitate coupling the surfboard bag 100 to the roof rack 202. The attachment system 102 can be integrated with the surfboard bag 100, which can enable the surfboard bag 100 to be at the ready for vehicular transportation. The attachment system 102 can include one or more straps, as described herein, that can facilitate coupling the surfboard bag 100 to the roof rack 202. The straps of the attachment system 102 can couple to one or more roof rack rails 204, which can extend in a longitudinal direction of the vehicle 200, of the roof rack 202.

The surfboard bag 100 can include a rack system 104. The rack system 104 can protect the surfboard within the surfboard bag 100 from the roof rack 202. For example, the rack system 104 can contact the roof rack 202 and space the surfboard away from the roof rack 202. The rack system 104 can be integrated with the surfboard bag 100, which can enable the surfboard bag 100 to be at the ready for vehicular transportation or other transportation. The rack system 104, as described herein, can provide rigidity to the surfboard bag 100 which can help prevent the surfboard bag 100 and/or surfboard from bending. The rack system 104, as described herein, can help protect the surfboard from damage or from damaging other objects. For example, the rack system 104 can contact a surface (e.g., supporting surface) to space the surfboard away from the surface.

Figure 1B:
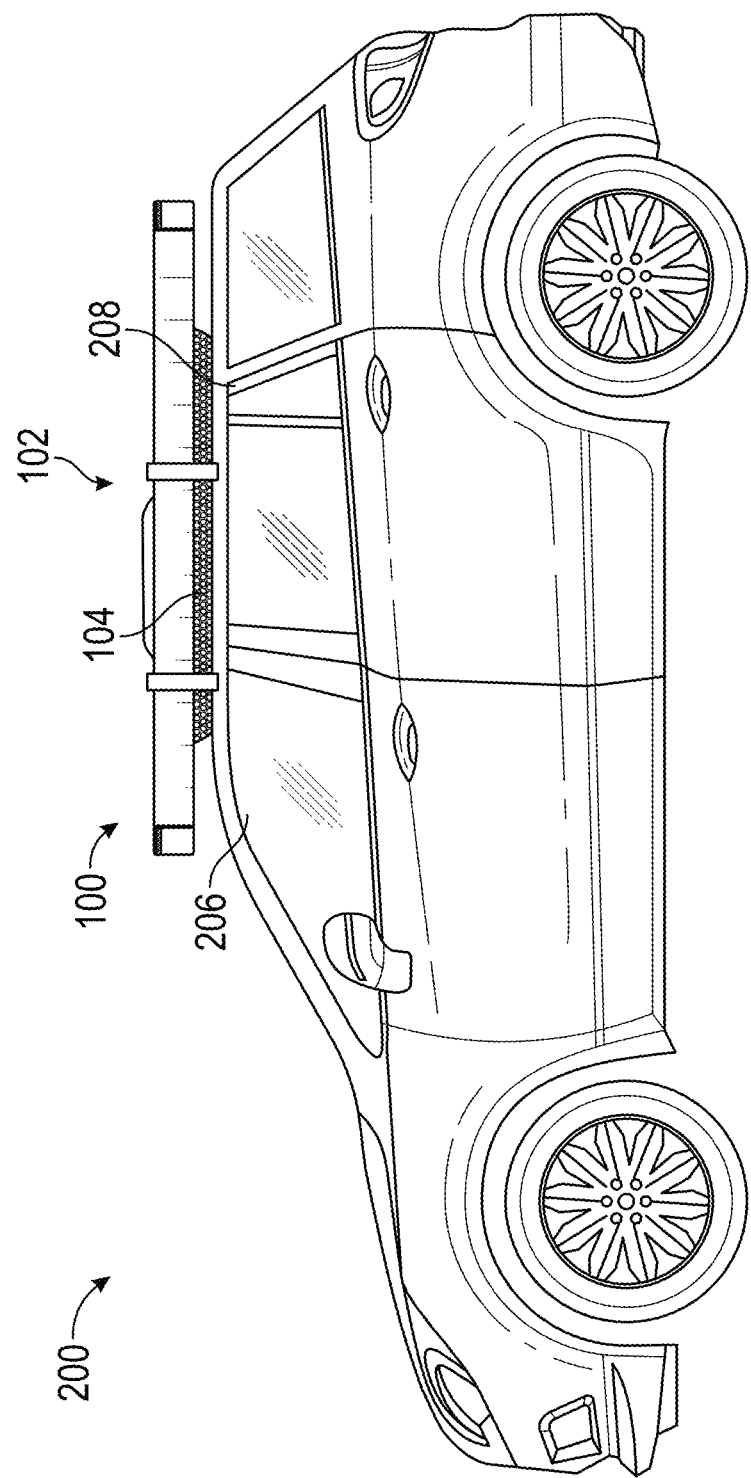
FIG. 1B illustrates the surfboard bag attached to the roof of the vehicle.

FIG. 1B illustrates the surfboard bag 100 coupled to a roof of the vehicle 200. In contrast to FIG. 1A, the vehicle 200 illustrated in FIG. 1B does not have a roof rack. The rack system 104 of the surfboard bag 100 can effectively replace the roof rack of the vehicle, enabling the surfboard bag 100 to be used with vehicles with or without roof racks. As illustrated in FIG. 1B, the rack system 104 can contact the roof of the vehicle 200. The rack system 104 can space the surfboard within the surfboard bag 100 away from the roof of the vehicle 200, which can protect the surfboard and roof from damage. The attachment system 102 can couple the surfboard bag 100 to the roof. As illustrated, the attachment system 102 includes straps extending through a rear door opening 208 and a front door opening 206 of the vehicle 200 to facilitate coupling. In some variants, the straps of the attachment system 102 can couple to a periphery of the door openings of the vehicle 200, which can include at least the peripheries of the rear door opening 208 and front door opening 206. In some variants, the straps of the attachment system 102 extend through the door openings (e.g., at least the rear door opening 208 and front door opening 206) of the vehicle 200 and couple to features on an opposing side of the surfboard bag 100 to attach the surfboard bag 100 to the roof of the vehicle 200.

Figure 2A:
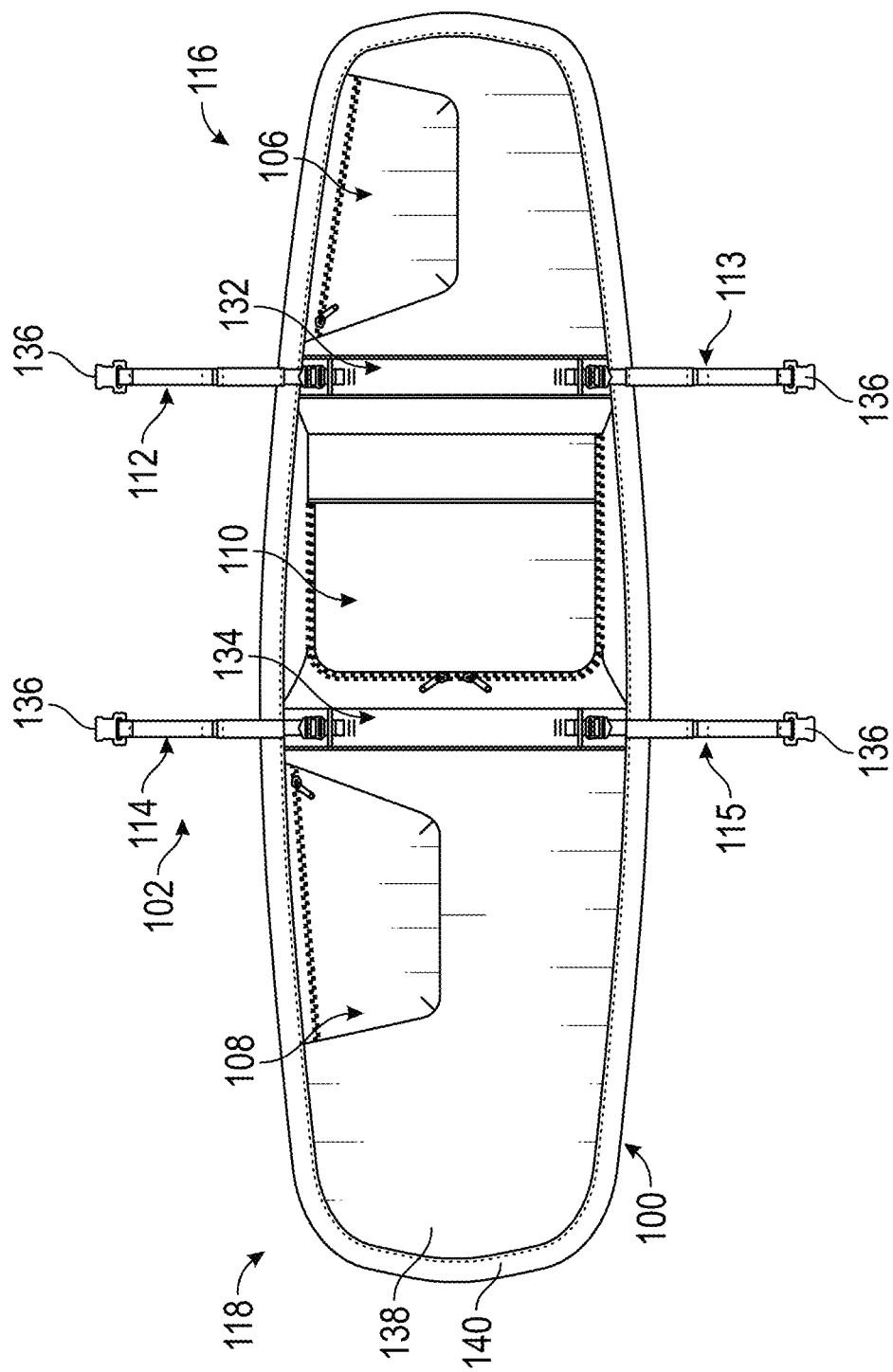
FIG. 2A illustrates a top view of the surfboard bag.

FIG. 2A illustrates a top view of the surfboard bag 100. The surfboard bag 100 can be made of a variety of materials, which can be conducive to use in an environment with frequent exposure to salt water and/or sunlight. For example, the surfboard bag 100 can utilize 420D thermoplastic elastomer (TPE) coated nylon ripstop for external fabric, which can be suitable for exposure to salt water, wax, sun light, etc. The surfboard bag 100 can include a lining material, such as a lining fabric (e.g., silver mylar film), inside the surfboard bag 100.

The surfboard bag 100 can be a variety of shapes and sizes. The surfboard bag 100 can include a wider central portion that tapers to two ends, wherein one of the tow ends can be wider than the other. As illustrated, the surfboard bag 100 is shaped and sized to house surfboards of a variety of shapes and sizes.

Figure 5A:
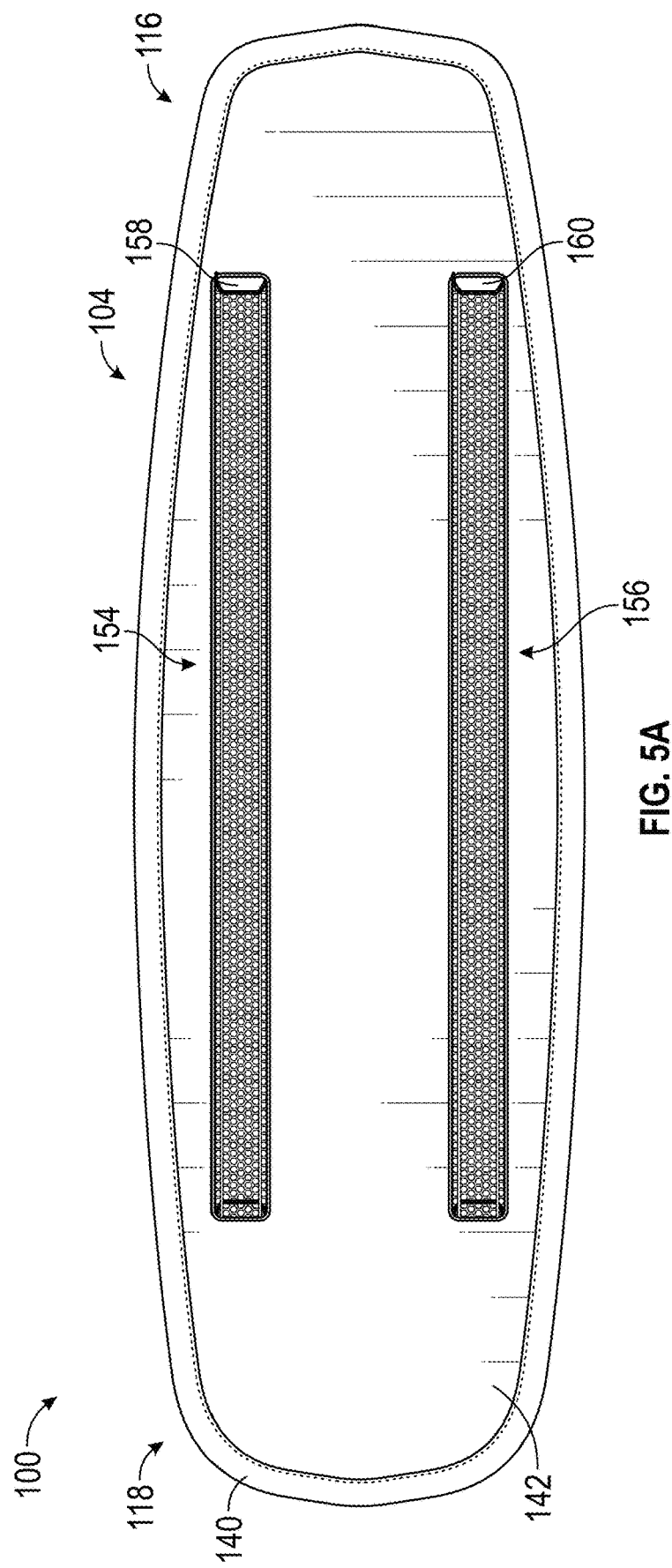
FIG. 5A illustrates a bottom view of the surfboard bag.

As described herein, the surfboard bag 100 can include padding to protect a surfboard housed therein and protect other objects. For example, the surfboard bag 100 can include an upper panel 138. The upper panel 138 can be padded (e.g., padded with 20 millimeter polyethylene foam). The surfboard bag 100 can include an intermediate portion 140. The upper panel 138 can be attached (e.g., sewn) to the intermediate portion 140. The intermediate portion 140 can extend beyond a periphery of the upper panel 138. The intermediate portion 140 can define a side wall that can define the periphery of the surfboard bag 100. The side wall can be padded, which can include being padded with 25 degree 1.5 inch ethylene-vinyl acetate foam. The surfboard bag 100 can include a lower panel 142 disposed on an opposite side of the surfboard bag 100 as the upper panel 138, as illustrated in FIG. 5A. The lower panel 142 can be padded (e.g., padded with 20 millimeter polyethylene foam). The lower panel 142 can be attached (e.g., sewn) to the intermediate portion 140. The intermediate portion 140 can extend beyond a periphery of the lower panel 142. Accordingly, the intermediate portion 140 can be positioned between the upper panel 138 and the lower panel 142. The upper panel 138, intermediate portion 140, and lower panel 142 can cooperate to protect a surfboard within the surfboard bag 100.

As described herein, the surfboard bag 100 can include an attachment system 102. The attachment system 102 can include one or more straps for attaching the surfboard bag 100 to the roof of a vehicle with or without a roof rack. The one or more straps can include a strap 112, strap 113, strap 114, and strap 115. The one or more straps, which can include the strap 112, strap 113, strap 114, and strap 115, can be positioned proximate a periphery of the surfboard bag 100. The one or more straps can include one end attached to the surfboard bag 100 and another free end that can attach to the roof rack of the vehicle, the periphery of a door opening of the vehicle, and/or another feature of the vehicle. The one or more straps can be flexible, stretchy, stiff, fixed in length, adjustable in length, etc.

The free end of the one or more straps can include a hook 136. The hook 136 can couple to the roof rack of the vehicle, the periphery of a door opening of the vehicle, and/or another feature of the vehicle. The one or more straps can be adjustable in length such that the one or more straps can be tightened or loosened. In some variants, the strap 112 can be positioned opposite the strap 113. In some variants, the strap 114 can be positioned opposite the strap 115. In some variants, the attachment system 102 can include more than four traps.

FIG. 2B illustrates an example strap 112 of the attachment system 102. The strap 112 can be the same as or similar to the strap 113, strap 114, and strap 115. As illustrated, the strap 112 can include a fixed webbing 128 that is attached to the surfboard bag 100. In some variants, one end of the fixed webbing 128 can be attached to an upper panel 138 or intermediate portion 140 of the surfboard bag 100. The one end of the fixed webbing 128 can be attached to the surfboard bag 100, upper panel 138, or intermediate portion 140 with one or more bartacks 130 (e.g., two). Another end of the fixed webbing 128 can be attached to a ladderlock buckle 126, which can be made of aluminum, as shown in FIG. 2C. Returning to FIG. 2B, an adjustable webbing 124 can be coupled to the ladderlock buckle 126. The adjustable webbing 124 can be threaded more or less through the ladderlock buckle 126 to adjust the length of the strap 112 to tighten or loosen the strap 112 onto the roof rack of a vehicle, roof of the vehicle, periphery of the door opening of the vehicle, etc. The strap 112 can include a sleeve 122, which can be made of a variety of materials such as neoprene. The adjustable webbing 124 can be attached (e.g., sewn) to one end of the sleeve 122. The other end of the sleeve 122 can be attached (e.g., sewn) to a webbing 120. The sleeve 122 can retain ends of the webbing 120 and adjustable webbing 124. The webbing 120 can be attached (e.g., fixedly) to a hook 136, as shown in FIGS. 2D and 2E, or other mechanism, such as a clip, fastener, etc. The hook 136 can be coated, which can protect the roof rack or vehicle from damage (e.g., scratches). In some variants, the hook 136 can be coated in fabric, which can protect the roof rack or vehicle from damage. Returning to FIG. 2B, the webbing of the strap 112 (e.g., fixed webbing 128, adjustable webbing 124, and webbing 120) can be a variety of sizes which can include twenty-five millimeters wide. The webbing 120, sleeve 122, and adjustable webbing 124, excluding the portion webbing 120 through the hook 136 and the portion of the adjustable webbing 124 through the ladderlock buckle 126, can be a variety of lengths, which can include eighteen inches. Other lengths can include less than 12, 12, 13, 14, 15, 16, 17, 18, 19, 20, 21, 22, 23, or 24 or more inches. The provided dimensions are exemplary and should not be considered limiting. When the straps are not in use, the straps can be decoupled from the ladderlock buckles 126 and stowed.

The surfboard bag 100 can, in some variants, include more than four straps to further secure the surfboard bag 100 to the roof and/or rack of a vehicle. In some exemplary embodiments, the surfboard bag 100 can include additional fastening locations (e.g., loops, rings, etc.) where additional straps can be attached to the surfboard bag 100.

Returning to FIG. 2A, the surfboard bag 100 can include one or more pockets to store a wet or dry suit and/or other objects. In some variants, the surfboard bag 100 can include, as illustrated, three pockets. For example, the surfboard bag 100 can include a first pocket 106. The first pocket 106 can be disposed on the upper panel 138. The first pocket 106 can be disposed proximate a first end 116 of the surfboard bag 100. The first pocket 106 can include an opening that can be zipped open and closed, which can include one or more #5 YKK reversed RC coil, standard pull and tab zippers. The first pocket 106 can include darts (e.g., 1.5 inch darts) sewn in the corners to improve structural integrity. The opening of the first pocket 106 can be disposed proximate a periphery of a side of the surfboard bag 100, which can improve accessibility when the surfboard bag 100 is mounted on a vehicle roof and/or being carried by the user. The first pocket 106 can, in some variants, be positioned on one side of a central longitudinal axis of the surfboard bag 100. The surfboard bag 100 can include a second pocket 108. The second pocket 108 can be disposed on the upper panel 138. The second pocket 108 can be disposed proximate a second end 118 of the surfboard bag 100. The second pocket 108 can include an opening that can be zipped open and closed, which can include one or more #5 YKK reversed RC coil, standard pull and tab zippers. The second pocket 108 can include darts (e.g., 1.5 inch darts) sewn in the corners to improve structural integrity. The opening of the second pocket 108 can be disposed proximate a periphery of a side of the surfboard bag 100, which can improve accessibly when the surfboard bag 100 is mounted on a vehicle roof and/or being carried by the user. The second pocket 108 can, in some variants, be positioned on one side of a central longitudinal axis of the surfboard bag 100.

Figure 8A:
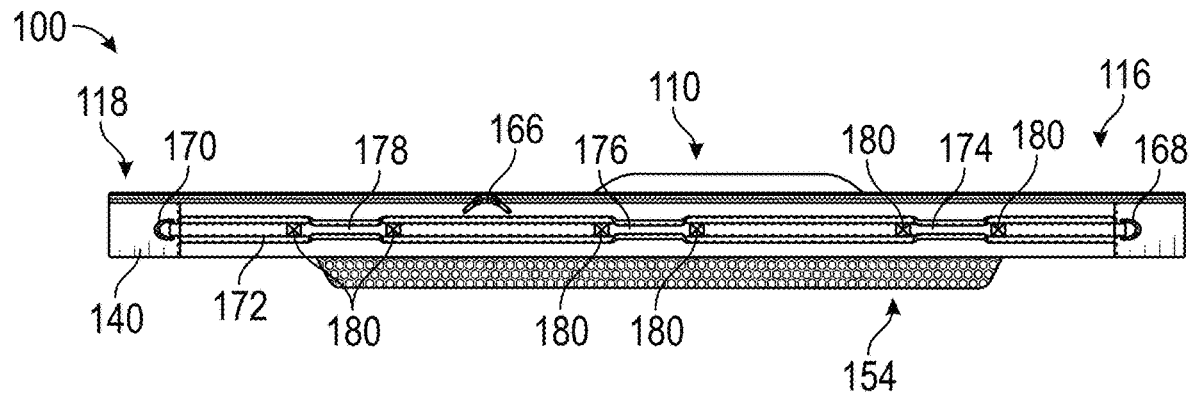
FIG. 8A illustrates a side view of the surfboard bag.

The surfboard bag 100 can include a third pocket 110. The third pocket 110 can be centrally located on the surfboard bag 100 (e.g., upper panel 138). In some variants, the third pocket 110 can be positioned between straps. The third pocket 110 can be larger than the first pocket 106 and/or second pocket 108. In some variants, the third pocket 110 can store a wet or dry suit, snow suit, jacket, coat, etc. In some variants, the third pocket 110 can store a bag that can store a wet or dry suit, snow suit, jacket, coat, etc. The third pocket 110 can include a height (e.g., not flat), as shown in FIG. 8A. The third pocket 110 can include an opening that can be zipped open and closed, which can include one or more #8 YKK reversed RC coil, standard pull and tab zippers (e.g., two). In some variants, the third pocket 110 can include one or more vents. The one or more vents (e.g., mesh window(s)) can allow air to flow into and/or out of the third pocket 110 to dry a wet suit, which can be advantageous when the surfboard bag 100 is on the roof of a vehicle during transport. In some variants, the one or more vents can be shaped to channel air through the third pocket 110 such that the air is accelerated therethrough.

In some variants, one or more of the pockets can lock to prevent unauthorized access. In some variants, the one or more pockets can include Faraday properties, such as a Faraday lining, to block communication between a vehicle's keys stored in the pocket and the vehicle such that the vehicle is not unintentionally unlocked.

Figure 3A:
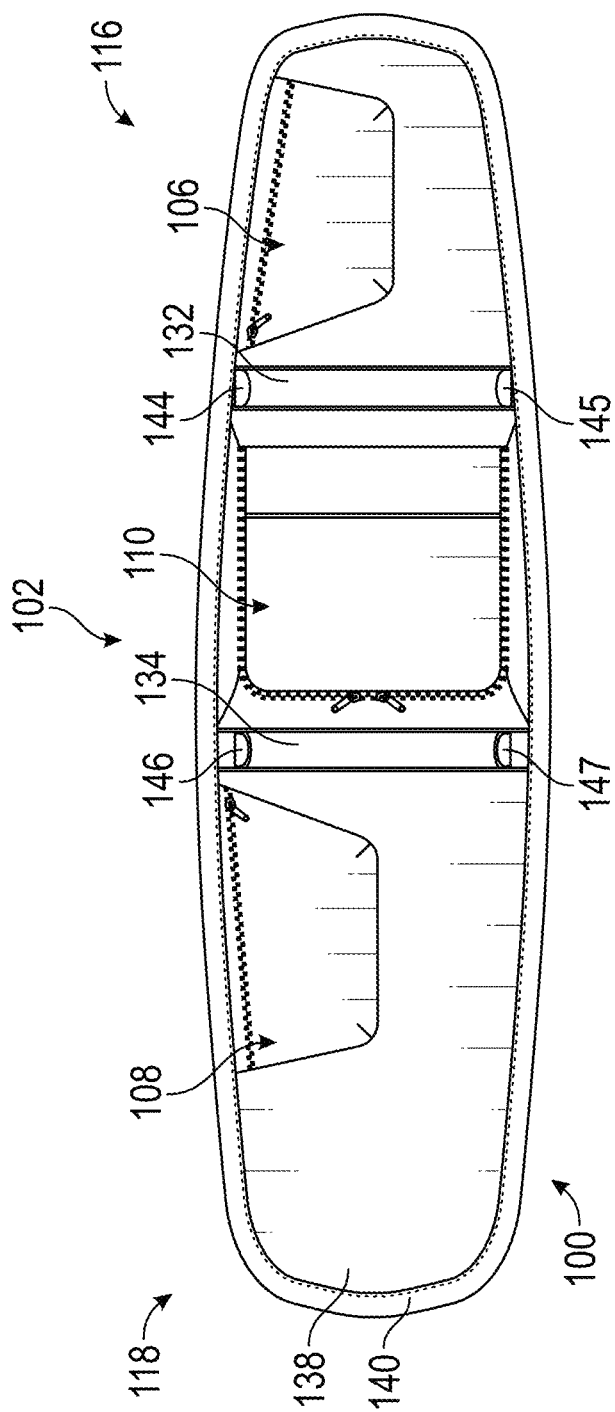
FIG. 3A illustrates a top view of an example surfboard bag.
Figure 3B:
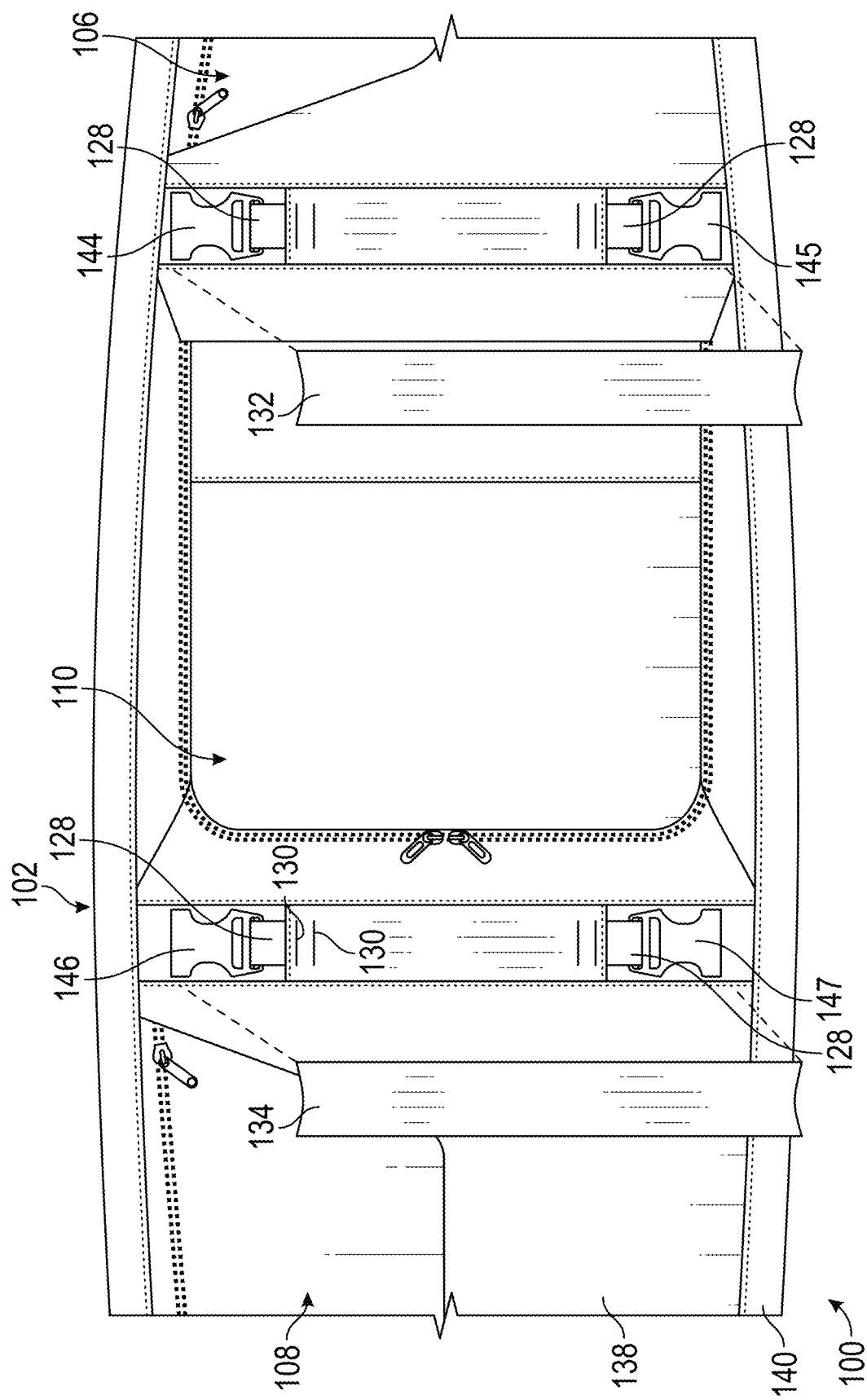
FIG. 3B illustrates an enlarged view of an attachment system of the surfboard bag.

FIG. 3A shows a top view of the surfboard bag 100 with another attachment system 102. The attachment system 102 can utilize side release buckles to conveniently couple and decouple straps from the surfboard bag 100. In some variants, the attachment system 102 can include one or more female sides, components, or portions of side release buckles attached to the surfboard bag 100. As illustrated, a female component 144, female component 145, female component 146, and female component 147 can be attached to the surfboard bag 100. As illustrated in FIG. 3B, fixed webbings 128 can be attached to each of the female components 144, 145, 146, 147 and the upper panel 138, which can include the fixed webbings 128 being attached by way of bartacks 130 to the upper panel 138. The surfboard bag 100 can include a first cover panel 132 and/or second cover panel 134. The first cover panel 132 can cover the attachment of the female component 144 and female component 145. For example, the first cover panel 132 can cover the attachments (e.g., bartacks 130) between the fixed webbing 128 coupled to the female component 144 and the upper panel 138 and the fixed webbing 128 coupled to the female component 145 and the upper panel 138. The second cover panel 134 can cover the attachment of the female component 146 and female component 147. The second cover panel 134 can cover the attachments (e.g., bartacks 130) between the fixed webbing 128 coupled to the female component 146 and the upper panel 138 and the fixed webbing 128 coupled to the female component 147. An open tunnel can extend under each of the first cover panel 132 and second cover panel 134. The side release buckles can be Duraflex 38 mm stealth buckles. In some variants, the side release buckles can be used to attach straps with hooks or other attachment features on the ends thereof to attach the surfboard bag 100 to a roof rack, periphery of a door opening of the vehicle, or other feature of the vehicle. In some variants, a strap (e.g., adjustable-in-length strap) can include a male component of a side release buckle on two opposite ends of the strap and couple to the female component 144 and female component 145. The strap can wrap around the roof rack of the vehicle to couple the surfboard bag 100 thereto. In some variants, the strap can extend through the door openings of the vehicle to couple the surfboard bag 100 to the roof. Similarly, a strap (e.g., adjustable-in-length strap) can include a male component of a side release buckle on two opposite ends of the strap and couple to the female component 144 and female component 145.

Figure 4:
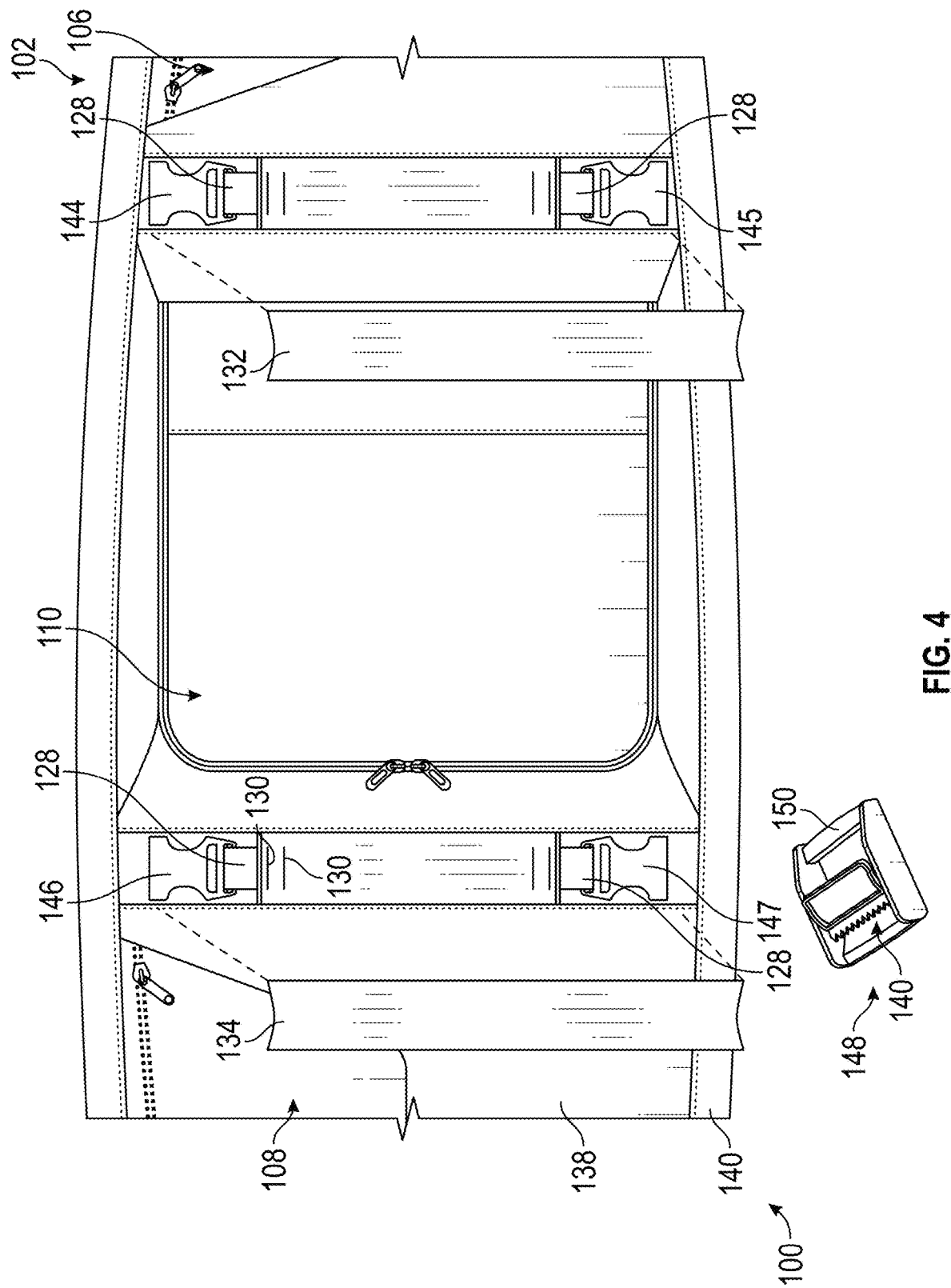
FIG. 4 illustrates an enlarged view of an attachment system of the surfboard bag.

FIG. 4 illustrates an attachment system 102 that includes cam buckles 148. The cam buckle 148 can replace the female components 144, 145, 146, 147 described in reference to FIGS. 3A and 3B. For example, fixed webbings 128 can attach a cam buckle 148 at the location of each of the female components 144, 145, 146, 147. The cam buckle 148 can include a bar 150, also referred to as a rod, strut, etc. The fixed webbing 128 can be attached to the bar 150 (e.g., loop around the bar 150) and the upper panel 138. The fixed webbing 128 can be attached by way of sewing (e.g., bartacks) as explained herein to the upper panel 138. The cam buckle 148 can include a lock 152. The lock 152 can be biased toward a closed position such that a gripping surface (e.g., teeth, grooves, rough surface) clamps down on webbing of the straps threaded through the cam buckles 148 when the lock 152 is released. The lock 152 can be maneuvered to an open position by the user overcoming the biasing force of the lock 152, which can allow the user to thread webbing into the cam buckle 148. The biasing force can be provided by a spring. A strap (e.g., webbing, nylon webbing) can be coupled to cam buckles 148 positioned at the locations of and in place of the female component 144 and female component 145. The strap can be shortened or lengthened by threading more or less of the strap through one of the cam buckles 148. The strap, as described herein, can be wrapped around the roof rack and/or routed through the door openings of the vehicle to attach the surfboard bag 100 to the roof. For example, one side of the strap can be attached to one cam buckle 148. The strap can then be routed around the roof rack or through the vehicle door openings and attached to the other cam buckle 148, securing the surfboard bag 100 to the roof rack or directly to the roof of the vehicle. Similarly, a strap (e.g., webbing) can be coupled to cam buckle 148 positioned at the locations of and in place of the female component 146 and female component 147. In some variants, a strap (e.g., webbing) can be routed through a cam buckle 148 in the place of female component 144 to couple the strap to the surfboard bag 100 and a second strap can be routed through a cam buckle 148 in the place of female component 145 to couple the second strap to the surfboard bag. The ends of the strap and the second strap opposite the cam buckles 148 can be coupled to corresponding male and female buckle components (e.g., side release buckle components) such that the strap and second strap can be coupled together via the male and female buckle components. The strap and second strap can be wrapped around the roof rack of a vehicle or routed through the door openings of the vehicle and coupled together via the coupling of the male and female buckle components to attach the surfboard bag 100 to the vehicle. The male and female buckle components can be attached to the strap and second strap via the ends of the strap and second strap being routed through (e.g., looping through) an opening of the male and female buckle components and doubling back on themselves. A band can be placed around the doubled over portions of the strap and second strap. Ends of the strap and second strap can include a sewn doubled over portion that prevents removal of the bands. The lengths of the strap and second strap (e.g., the length of strap separating the buckle component and the cam buckle) can be adjusted by positioning more or less of the strap and second strap through the bands. The cam buckles 148 can be made of a variety of materials, such as metal or metal alloys. In some variants, the cam buckles 148 can be coated, which can protect the roof rack and/or vehicle from damage. In some variants, the cam buckles 148 can be at least partially covered with a fabric material to protect the roof rack and/or vehicle from damage. The straps can be stored in pockets of the surfboard bag 100 when not in use.

FIG. 5A illustrates a bottom view of the surfboard bag 100. As described herein, the surfboard bag 100 can include a rack system 104. The rack system 104 can be integrated with the surfboard bag 100. The rack system 104 can be disposed on a lower portion of the surfboard bag 100 such as the lower panel 142. The rack system 104 can include one or more rails (e.g., bars, supports, blocks, etc.). For example, the rack system 104 can include a first rail 154 and second rail 156. The first rail 154 and/or second rail 156 can be elongate. The first rail 154 and/or second rail 156 can be oriented in a longitudinal direction of the surfboard bag 100 and/or vehicle 200. The first rail 154 and/or second rail 156 can be parallel to a longitudinal axis or direction of the surfboard bag 100. An elongate dimension of the first rail 154 and/or second rail 156 can be in a longitudinal direction of the surfboard bag 100. The first rail 154 and second rail 156 can be spaced apart from each other to provide stable support for the surfboard bag 100 when positioned on a surface. The first rail 154 and second rail 156 can be parallel to each other (e.g., substantially or exactly parallel), which can be defined along the portion of the first rail 154 and second rail 156 along the bottom surface of the surfboard bag 100. The first rail 154 and/or second rail 156 can include chamfered or rounded edges. In some variants, a leading and/or trailing edge or side of the first rail 154 and/or second rail 156 can be angled or inclined. The first rail 154 and second rail 156 can be mirrored relative to each other about a longitudinal axis of the surfboard bag 100. The first rail 154 and/or second rail 156 can have different shaped peripheries, which can include polygonal, rectangular, circular, hex-shaped, multi-shaped, etc. The first rail 154 and/or second rail 156 can include a flat surface configured to face the vehicle when the flexible enclosure is coupled to the vehicle. As described herein, the first rail 154 and/or second rail 156 can provide rigidity to the surfboard bag 100. For example, the first rail 154 and/or second rail 156 can prevent or reduce bending of the surfboard bag 100 and/or surfboard therein about a transverse axis (e.g., axis perpendicular to the longitudinal axis of the surfboard bag) of the surfboard bag 100. The first rail 154 and/or second rail 156 can prevent or reduce movement of the surfboard bag 100 (e.g., flapping in wind, etc.) when disposed on the roof of a vehicle that is moving. The orientation of the first rail 154 and/or second rail 156 in the longitudinal direction of the surfboard bag 100 can provide a more aerodynamic configuration compared to orienting the first rail 154 and/or second rail 156 in a transverse direction of the surfboard bag 100 (i.e., a direction that is perpendicular to the longitudinal direction of the surfboard bag 100). In some variants, the surfboard bag 100 can include more than two rails. For example, the surfboard bag can include three rails, which can include a third rail disposed between the first rail 154 and/or second rail 156. The first rail 154 and second rail 156 can be mirrored relative to the third rail. In some variants, the first rail 154 and second rail 156 can be equally spaced away for the third rail. The third rail can be the same as or different than the first rail 154 and/or second rail 165.

The first rail 154 and/or second rail 156 can space the surfboard within the surfboard bag 100 away from the roof of the vehicle and/or away from the roof rack of the vehicle, protecting the surfboard and/or vehicle from damage. The first rail 154 and/or second rail 156 can be of sufficient length to raise the surfboard bag 100 off of the surface of the vehicle when positioned thereon. In some variants, the first rail 154 and/or second rail 156 are the same length. In some variants, the first rail 154 and/or second rail 165 are different lengths. In some variants, the first rail 154 and/or second rail 156 can be the same size and/or shape. In some variants, the first rail 154 and/or second rail 156 can be different sizes and/or shapes. In some variants, the first rail 154 and/or second rail 156 can be the same or different widths. In some variants, the first rail 154 and/or second rail 156 can have a cross-section that varies or is constant. As described herein, the first rail 154 and/or second rail 156 can help to protect the surfboard within the surfboard bag 100 during handling and storage for air transportation, using public transportation, or the like. For example, the first rail 154 and/or second rail 156 can contact a conveyor or other surface to protect the surfboard within the bag, which can include spacing the surfboard away from the conveyor or other surface. In some variants, the surfboard bag 100 can include more than two rails.

Figure 5B:
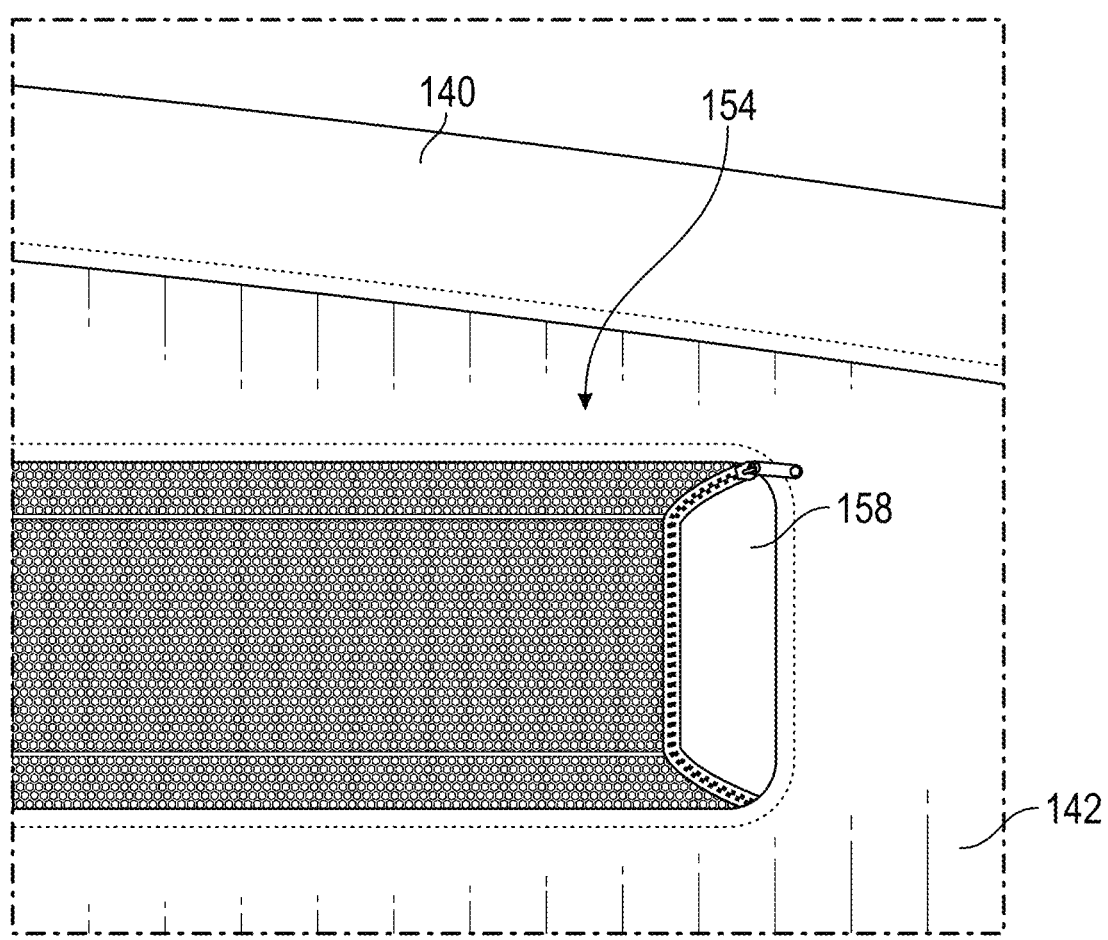
FIG. 5B illustrates an enlarged view of a portion of a rail of a rack system of the surfboard bag.
Figure 5C:
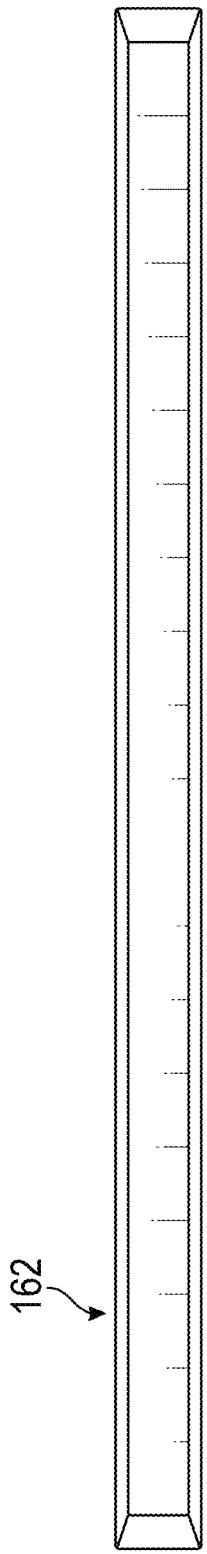
FIGS. 5C, 5D, and 5E illustrates various views of a rail insert of the rail of the rack system of the surfboard bag.
Figure 5D:
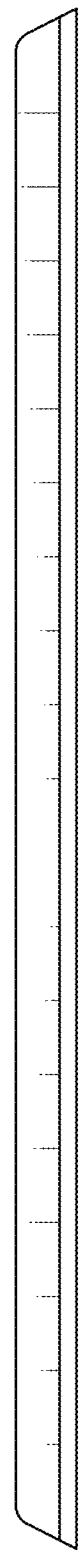
Figure 5E:
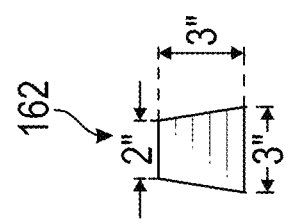

The outer surface of the first rail 154 and/or second rail 156 can be made of a variety of materials. For example, the outer surface can include a textured and/or coated fabric that is tacky. In some variants, the outer surface includes 1680D ballistic nylon. Each of the first rail 154 and/or second rail 156 can include an opening to receive one or more inserts in a cavity therein. The first rail 154 can include a first cover 158 that can be zipped open and shut (e.g., #3 reversed coil YKK RC zipper) to provide access into a cavity of the first rail 154, as shown in FIG. 5B. The second cover 160 can include a second cover 160 that can be zipped open and shut (e.g., #3 reversed coil YKK RC zipper) to provide access into a cavity of the second rail 156. FIGS. 5C, 5D, and 5E illustrate an example rail insert 162 that can be inserted into the cavity of the first rail 154 and/or second rail 156. The rail insert 162 can be removed when the user does not desire for the surfboard bag 100 to remain rigid, which can be when the user desires to wash the surfboard bag 100. The rail insert 162 can be removed and replaced as needed. The rail insert 162 can be made of semi-rigid material, which can include foam. In some variants, the rail insert 162 can be a dual layer foam laminate, which can include polyethylene foam (e.g., 1.5 inch thick layer) and an ethylene-vinyl acetate, 35 degree foam (e.g., 1 inch thick layer). In some variants, the polyethylene foam can be spaced away from the lower panel 142 (e.g., the ethylene-vinyl acetate, 35 degree foam can be positioned between the polyethylene foam and the lower panel 142). In some variants, the rail insert 162 can include, laminated to the outer surface, a textured and/or coated fabric that is tacking (e.g., 1680D ballistic nylon). As shown in FIG. 5D, the rail insert 162 can include tapered or angled ends. FIG. 5E illustrates a cross-section of the rail insert 162 at a position that is offset from the ends of the rail insert 162. As illustrated, the rail insert 162 can have a tapered profile being narrower on one side compared to an opposite side. FIG. 5E illustrates some example dimensions that should not be considered limiting. The rail insert 162 can be tapered from a width of 3 inches to 2 inches. The rail insert 162 can have be a variety of heights, which can include 1.5, 2.5, or 3 inches. Other dimensions can be used. In some variants, the rail insert 162 can include two layers of material (e.g., foam) that are each 1.5 inches thick. In some variants, the rail insert 162 can include more than two layers, such as three, four, or more. In some variants, the rail insert 162 can include a single layer of material (e.g., foam), which can be various thicknesses such as 1.5 inches. The provided dimensions are exemplary and should not be considered limiting.

Figure 6:
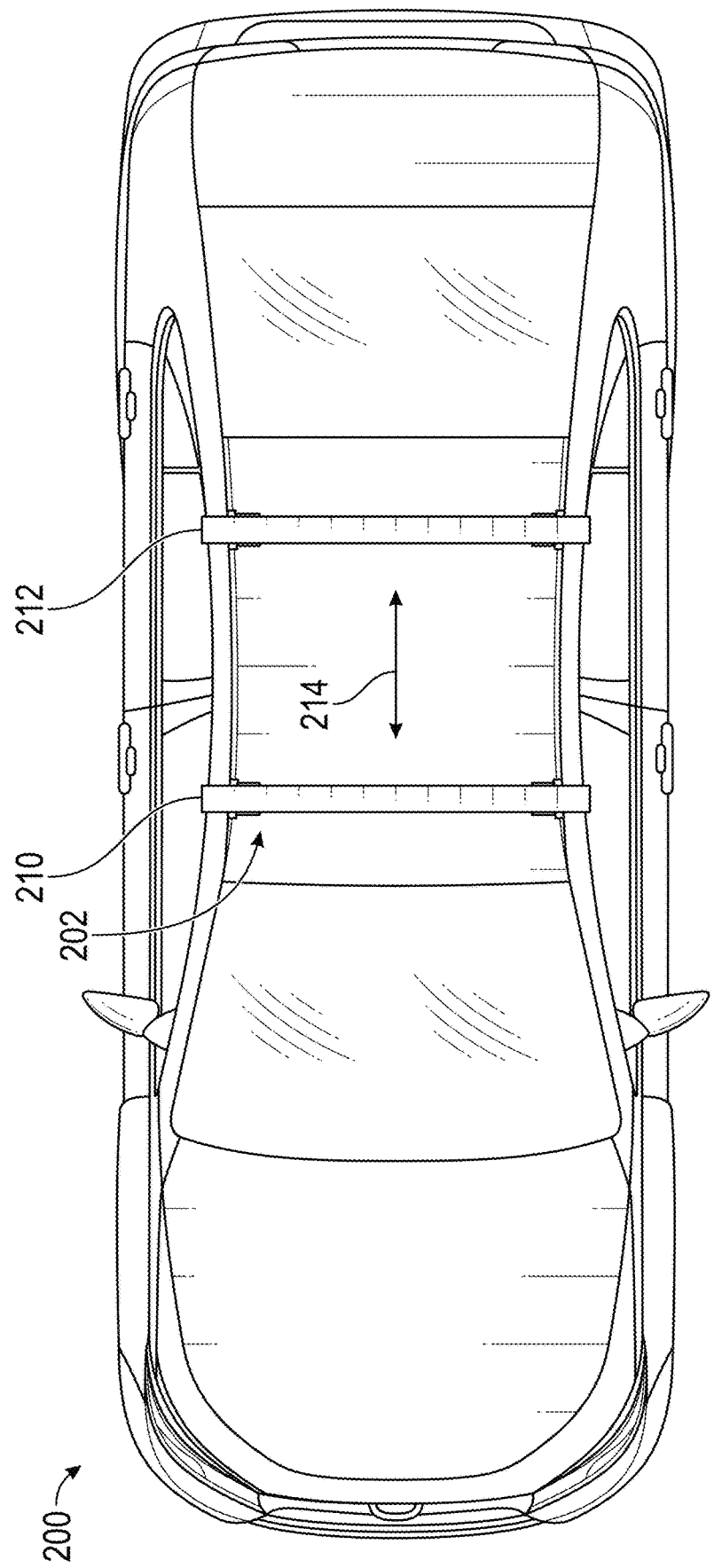
FIG. 6 illustrates a top view of an example roof rack of a vehicle with cross supports.

FIG. 6 illustrates a vehicle 200 with a roof rack 202. The roof rack 202 includes a first cross support 210 and a second cross support 212. The first cross support 210 and second cross support 212 of the roof rack 202 can be separated by a distance 214, which can vary. The orientation of the first rail 154 and/or second rail 156 in the longitudinal direction can enable the first rail 154 and/or second rail 156 to contact and support the surfboard bag 100 on cross supports separated by a variety of distances 214. For example, the first rail 154 and/or second rail 156 can support the surfboard bag 100 on cross supports separated by a distance up to the length of the first rail 154 and second rail 156 or a small amount less than the length of the first rail 154 and second rail 156 (e.g., 1, 2, 3, 4, 5, 6, 7, 8, 9, 10 or more inches less than the length of the first rail 154 and second rail 156).

Figure 7:
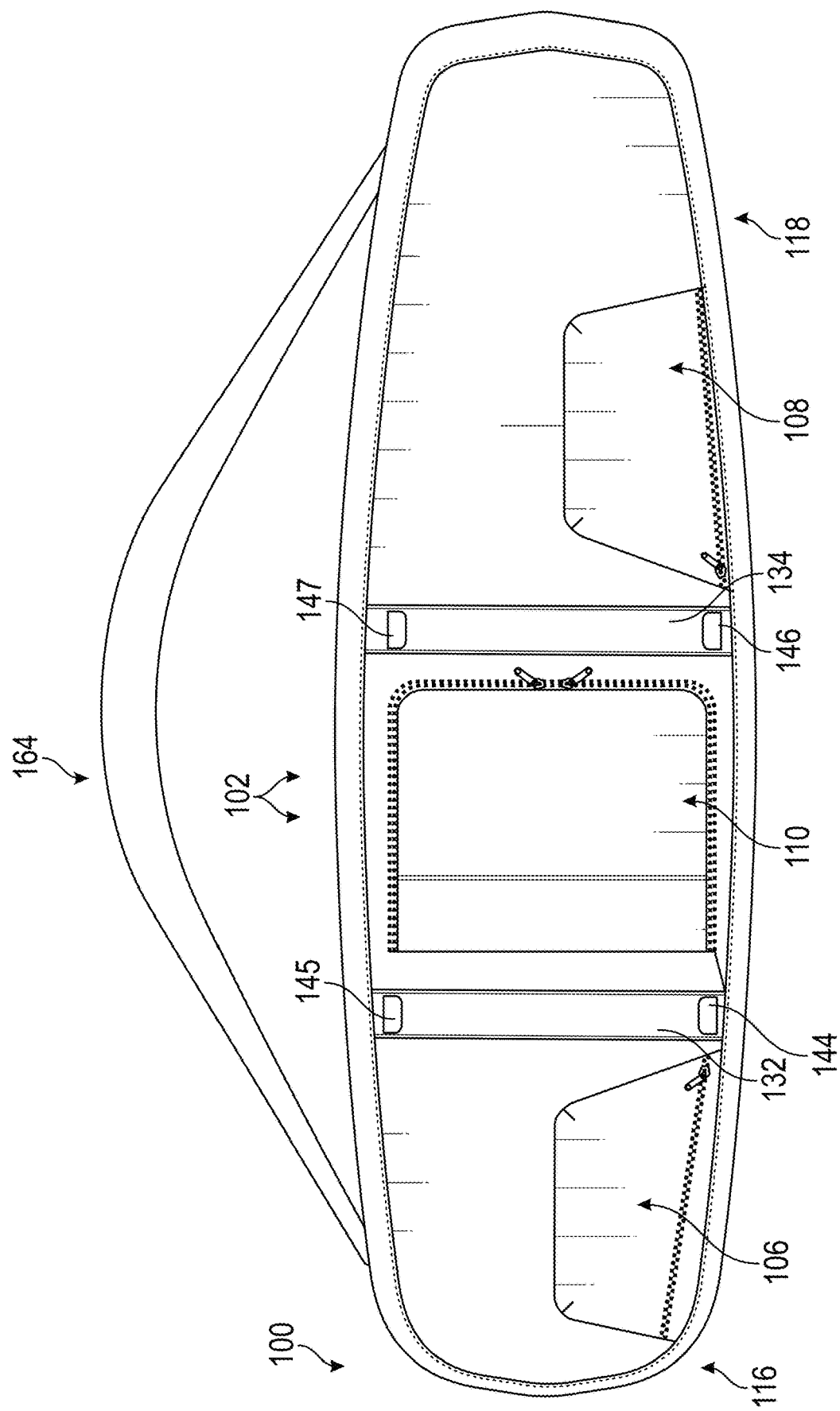
FIG. 7 illustrates the surfboard bag with a shoulder strap.

FIG. 7 illustrates the surfboard bag 100 with a shoulder strap 164. The shoulder strap 164 can enable the user to carry the surfboard bag 100 with ease (e.g., less tiring than carrying by hand) and allow the user to still have use of the user's hands.

Figure 8B:
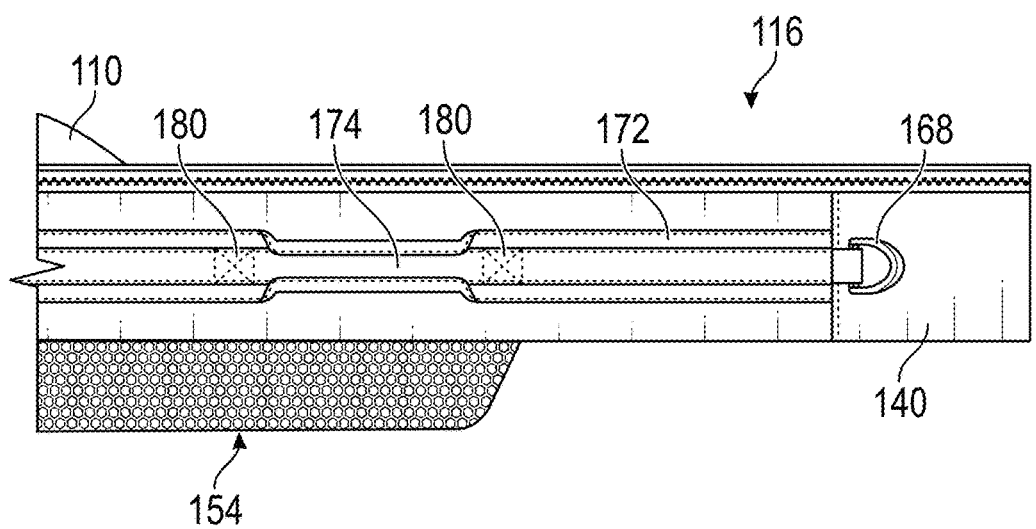
FIG. 8B illustrates an enlarged side view of a portion of the surfboard bag.

FIG. 8A illustrates a side view of the surfboard bag 100. The surfboard bag 100 can include loops, rings, or the like to facilitate coupling a shoulder strap to the surfboard bag 100. As illustrated, the surfboard bag 100 can include a D ring 170 and D ring 168 that can be used to couple the shoulder strap to the surfboard bag 100. The D ring 170 can be positioned proximate the second end 118. The D ring 168 can be positioned proximate the first end 116. The D ring 168 and D ring 170 can be a variety of sizes and/or made of a variety of materials, which can include one inch aluminum D rings. The D ring 168 and D ring 170 can be coupled to a handle webbing 172 and/or the intermediate portion 140, as shown in FIG. 8B. The handle webbing 172 can be attached (e.g., sewn) to the intermediate portion 140 (e.g., side wall) of the surfboard bag 100. The handle webbing 172 can be attached to and extend along a side of the surfboard bag 100 (e.g., intermediate portion 140). The handle webbing 172 can be a variety of sizes, which can include being 2 inches wide.

The surfboard bag 100 can include one or more handles, which can be part of the handle webbing 172. The one or more handles can be grasped by the user to maneuver the surfboard bag 100. For example, the surfboard bag 100 can include a first handle 174, second handle 178, and/or third handle 176. The first handle 174, second handle 178, and/or third handle 176 can be disposed along the side of the surfboard bag 100 (e.g., side of the intermediate portion 140). The first handle 174, second handle 178, and/or third handle 176 can be constructed of the handle webbing 172 wrapped around 1 inch webbing. Each of the first handle 174, second handle 178, and/or third handle 176 can be reinforced with box X stitching 180 and/or bartacks on opposing sides.

Figure 8C:
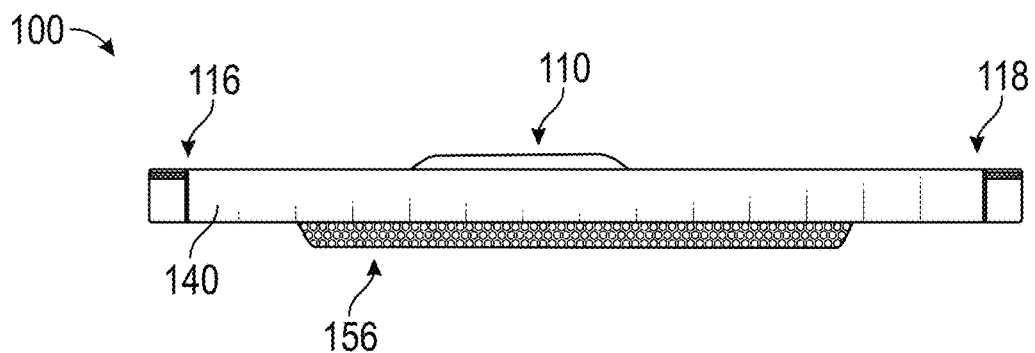
FIG. 8C illustrates another side view of the surfboard bag.

The surfboard bag 100 can be opened and closed by way of one or more zippers 166 (e.g., two) or other mechanism to provide access into an interior (e.g., cavity) of the surfboard bag 100 to house or remove surfboards. The zippered opening of the surfboard bag 100 can extend around a portion of the periphery of the surfboard bag 100 (e.g., periphery of the intermediate portion 140) such that the surfboard bag 100 can be opened. The portion of the periphery of the surfboard bag 100 that does not include the zippered opening, shown in FIG. 8C, can be a hinge about which the upper panel 138 can rotate to open or close the surfboard bag 100.

Figure 9:
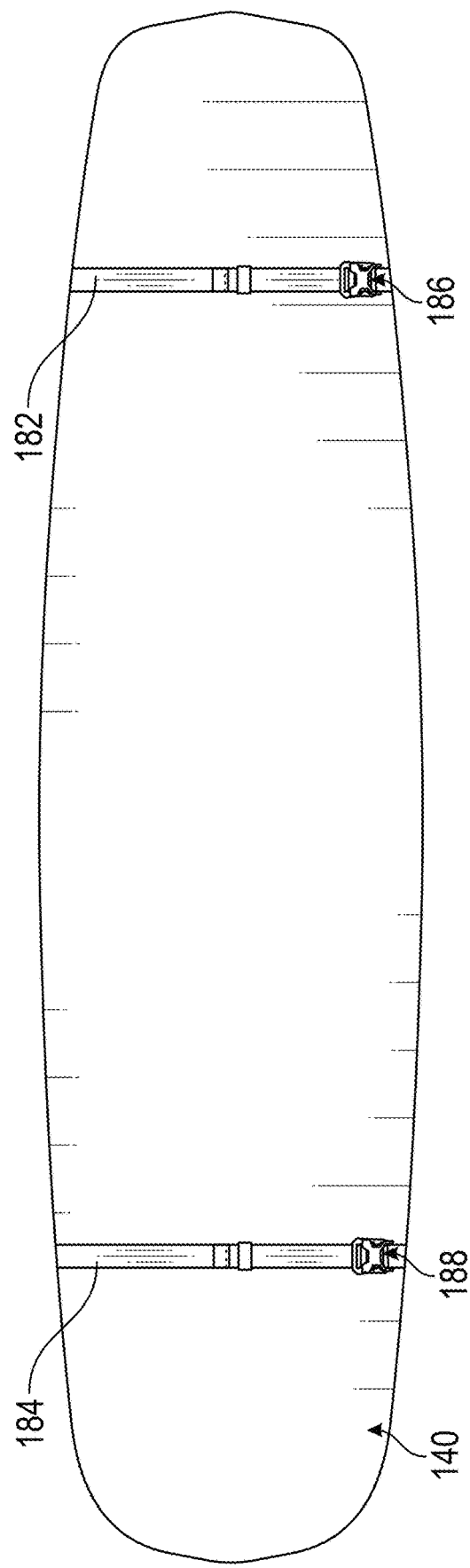
FIG. 9 illustrates an intermediate portion of the surfboard bag.

FIG. 9 illustrates an inside surface of the intermediate portion 140. In some variants, the inside surface can include a first strap 182 and/or a second strap 184 attached thereto. The first strap 182 and/or a second strap 184 can be used to secure the surfboard within the surfboard bag 100. The first strap 182 and/or a second strap 184 can be adjustable in length to tighten or loosen around a surfboard. The first strap 182 and/or a second strap 184 can be webbing. In some variants, the first strap 182 and/or a second strap 184 can be flexible, stretchy, stiff, fixed in length, adjustable in length, etc. The first strap 182 and/or second strap 184 can wrap around the surfboard. In some variants, the first strap 182 can include a first buckle 186 and/or the second strap 184 can include a second buckle 188. The first buckle 186 and second buckle 188 can be used to clip the surfboard within the first strap 182 and second strap 184, respectively. The first buckle 186 and second buckle 188 can be 25 millimeter Duraflex single adjust XLite buckles. The first strap 182 and/or second strap 184 can be a variety of lengths, which can include 30 inches in length.

Figure 10A:
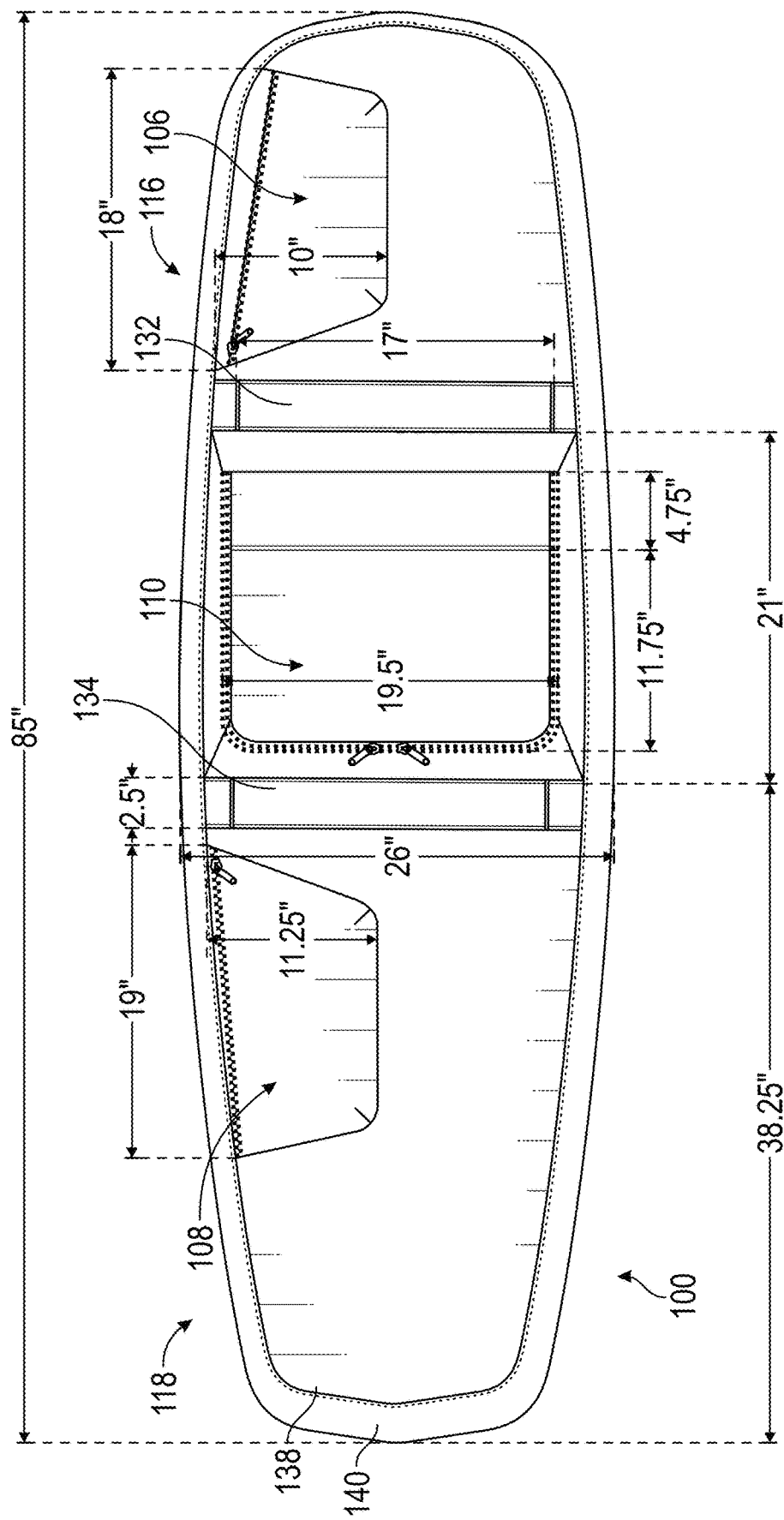
FIG. 10A illustrates a top view of the surfboard bag with example dimensions.
Figure 10B:
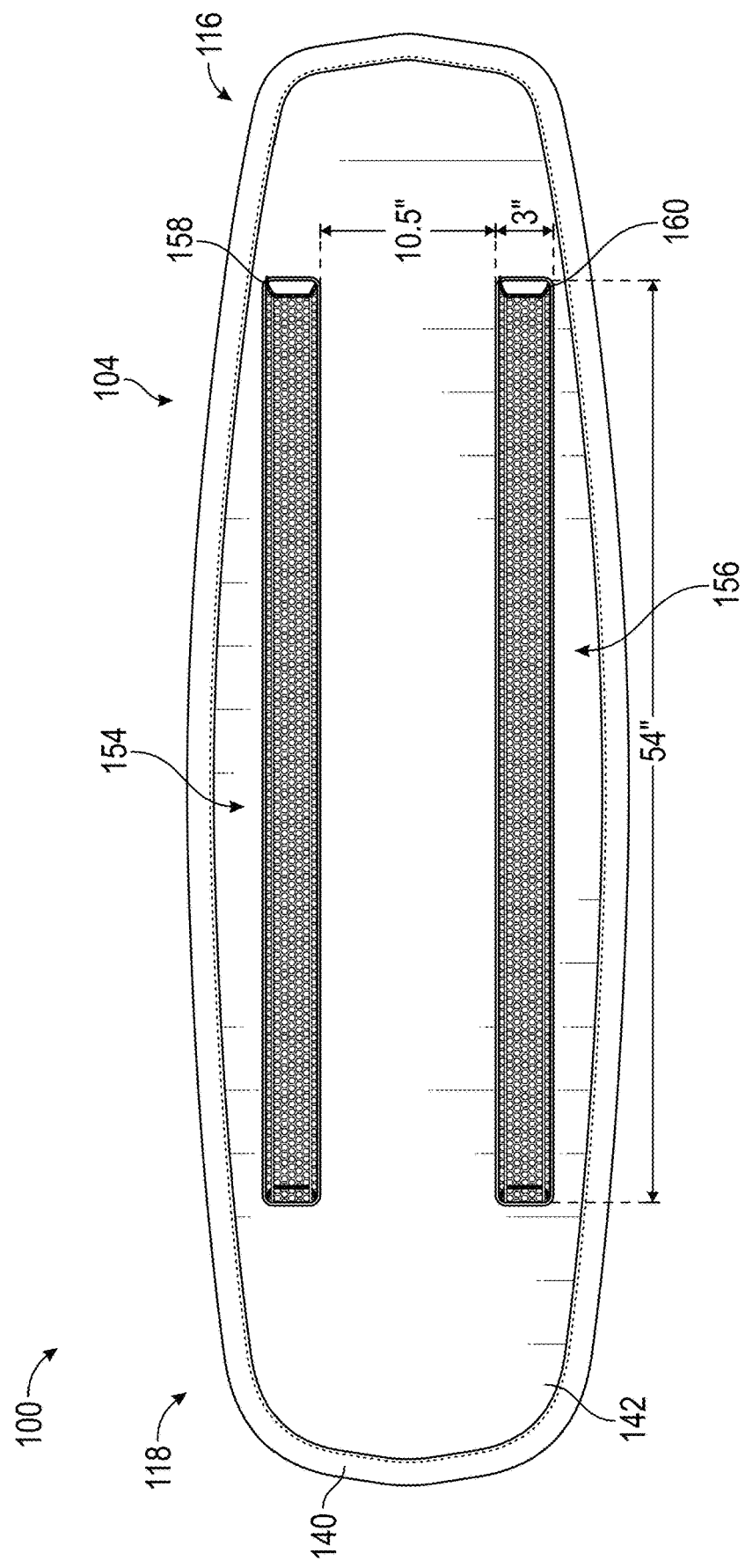
FIG. 10B illustrates a bottom view of the surfboard bag with example dimensions.
Figure 10C:
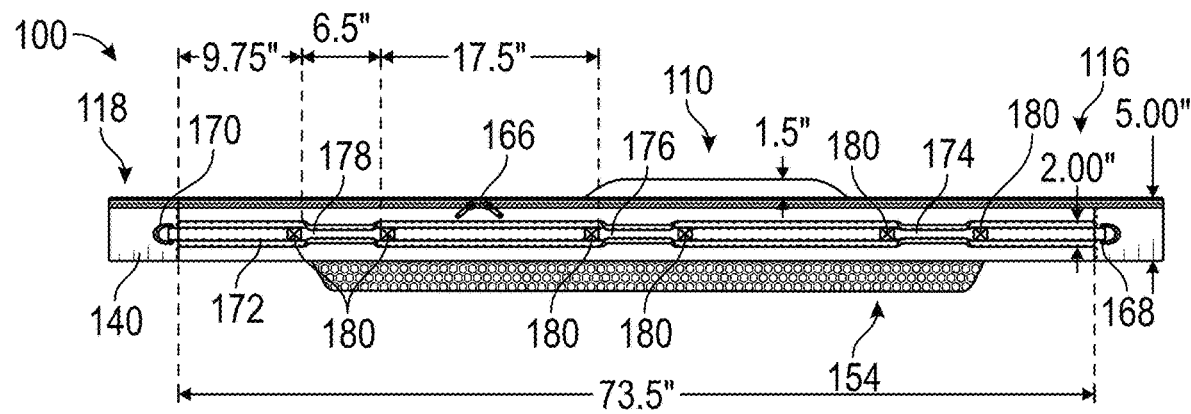
FIG. 10C illustrates a side view of the surfboard bag with example dimensions.
Figure 10D:
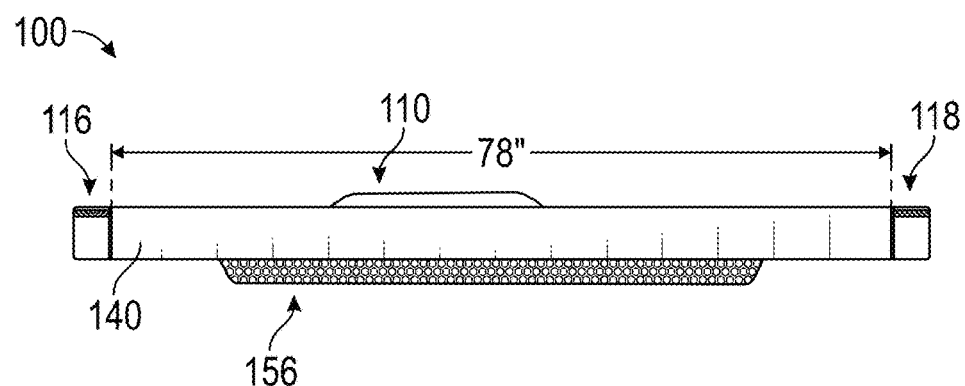
FIG. 10D illustrates another side view of the surfboard bag with example dimensions.

FIGS. 10A-10D illustrate example dimensions for the surfboard bag 100 that should not be considered limiting. For example, as shown in FIG. 10A, the total length of the surfboard bag 100 can be 85 inches. The total width of the surfboard bag 100 can be 26 inches. The length of the first pocket 106 can be 18 inches and the width can be 10 inches. The length of the second pocket 108 can be 19 inches and the width can be 11.25 inches. The lengths of each of the first cover panel 132 and second cover panel 134 can be 17 inches and the widths of each of the first cover panel 132 and second cover panel 134 can be 2.5 inches. The distance between the proximate peripheries of the first cover panel 132 and second cover panel 134 can be 21 inches. The width of the third pocket 110 can be 19.5 inches. The distance between the second end 118 and the far side of the second cover panel 134 can be 38.25 inches. As shown in FIG. 10B, the lengths of the first rail 154 and second rail 156 can be 54 inches and the widths of the first rail 154 and second rail 156 can be 3 inches. The distance between proximate sides of the first rail 154 and second rail 156 can be 10.5 inches. As shown in FIG. 10C, the thickness of the intermediate portion 140 can be 5 inches. The height of the third pocket 110 can be 1.5 inches, which can be measured from a top surface of the intermediate portion 140. The length of the handle webbing 172 attached (e.g., sewn) to the intermediate portion 140 can be 73.5 inches. The distance between the third handle 176 and second handle 178 can be 17.5 inches. The length of the first handle 174, third handle 176, and/or second handle 178 can be 6.5 inches. The distance between the end of the handle webbing 172 proximate the second end 118 that is attached to the intermediate portion 140 to the proximate side of the second handle 178 can be 9.75 inches. As illustrated in FIG. 10D, the distance between the ends of the zippered opening can be 78 inches (e.g., the hinge about which the upper panel 138 rotates can be 78 inches).

Terminology

Although this disclosure has been described in the context of certain embodiments and examples, a person of ordinary skill in the art would recognize, after reviewing the disclosure herein, that any embodiment disclosed can be combined with other embodiments, portions/aspects of other embodiments, and/or technologies known in the art to accomplished the desired advantages discussed herein. It will be understood by those skilled in the art, after reviewing the disclosure herein, that the disclosure extends beyond the specifically disclosed embodiments to other alternative embodiments and/or uses and obvious modifications and equivalents thereof. In addition, while several variations of the embodiments of the disclosure have been shown and described in detail, other modifications, which are within the scope of this disclosure, will be readily apparent to those of skill in the art after reviewing the disclosure herein. It is also contemplated that various combinations or sub-combinations of the specific features and aspects of the embodiments may be made and still fall within the scope of the disclosure. For example, features described above in connection with one embodiment can be used with a different embodiment described herein and the combination still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this invention may comprise, additional to its essential features described herein, one or more features as described herein from each other embodiment of the invention disclosed herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate after reviewing the disclosure herein that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize, after reviewing the disclosure herein, that the disclosure may be embodied or carried out in a manner that achieves one advantage or a group of advantages as taught herein without necessarily achieving other advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The term "and/or" has similar meaning in that when used, for example, in a list of elements, the term "and/or" means one, some, or all of the elements in the list, but does not require any individual embodiment to have all elements.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

Values and ranges of values disclosed herein are examples and should not be construed as limiting. The values and ranges of values disclosed herein can be altered while gaining the advantages discussed herein. The listed ranges of values disclosed herein can include subsets of ranges or values which are part of this disclosure. Disclosed ranges of values or a single value for one feature can be implemented in combination with any other compatible disclosed range of values or value for another feature. For example, any specific value within a range of dimensions for one element can be paired with any specific value within a range of dimensions for another element. One of ordinary skill in the art will recognize from the disclosure herein that any disclosed length of a spar may be combined with any disclosed width of a foil, each having any disclosed shape.

Any methods disclosed herein need not be performed in the order recited. The methods disclosed herein include certain actions taken by a practitioner; however, they can also include any third-party instruction of those actions, either expressly or by implication. For example, actions such as "controlling a motor speed" include "instructing controlling of a motor speed."

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Additionally, all publications, patents, and patent applications mentioned in this specification are herein incorporated by reference to the same extent as if each individual publication, patent, or patent application was specifically and individually indicated to be incorporated by reference.

What is claimed is:

1. A method of attaching a sports board to a vehicle, the method comprising:
    moving an access panel of at least one elongate rail disposed along an exterior of a flexible enclosure to access a hollow interior portion;
    inserting a semi-rigid rail insert into the hollow interior portion, the semi-rigid rail insert comprising an angled end and a flat surface configured to face a surface of the vehicle;
    opening the flexible enclosure;
    inserting the sports board into the flexible enclosure;
    attaching one or more straps to the flexible enclosure;
    positioning the flexible enclosure on top of the vehicle such that the at least one elongate rail of the flexible enclosure is disposed between the sports board and the vehicle;
    orienting the at least one elongate rail in a longitudinal direction of the vehicle; and
    coupling the one or more straps to the vehicle to secure the sports board within the flexible enclosure to the vehicle.

2. The method of claim 1, wherein attaching the one or more straps to the flexible enclosure comprises inserting one of the one or more straps through a ladderlock buckle attached to the flexible enclosure.

3. The method of claim 1, wherein attaching the one or more straps to the flexible enclosure comprises inserting one side of a side release buckle attached to the one or more straps into another corresponding side of the side release buckle attached to the flexible enclosure.

4. The method of claim 1, wherein attaching the one or more straps to the flexible enclosure comprises inserting the one or more straps through one or more cam buckles attached to the flexible enclosure.

5. The method of claim 1, wherein attaching the one or more straps to the vehicle comprises attaching the one or more straps to a roof rack of the vehicle or attaching the one or more straps directly to a roof of the vehicle.

* * * * *